June 4, 1946.  W. A. EATON  2,401,681
VALVE MECHANISM
Filed Feb. 17, 1944
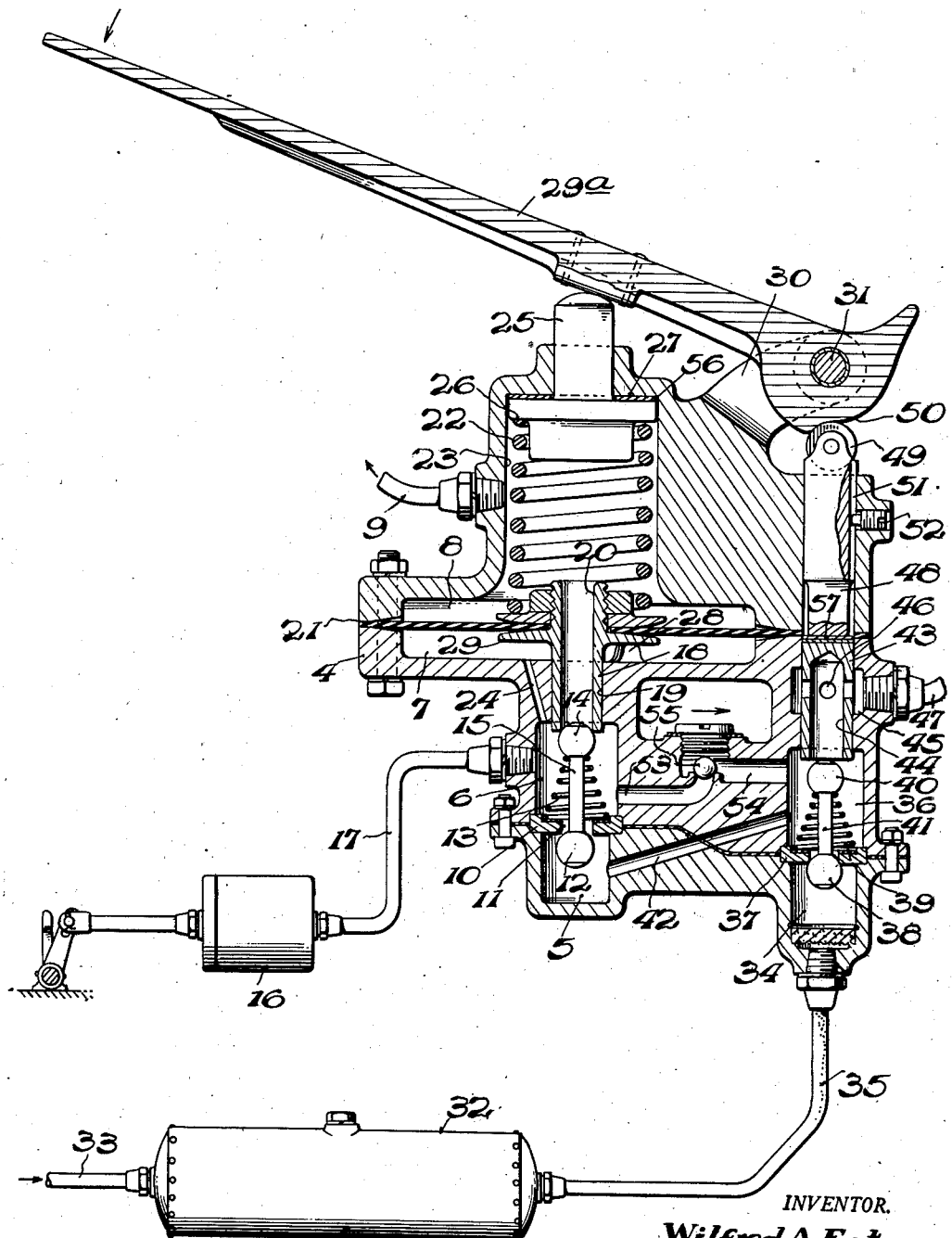
INVENTOR.
Wilfred A. Eaton.
BY
Scrivener & Parker
ATTORNEYS Patented June 4, 1946

2,401,681

UNITED STATES PATENT OFFICE 2,401,681

VALVE MECHANISM

Wilfred A. Eaton, Elyria, Ohio, assignor to Bendix-Westinghouse Automotive Air Brake Company, Elyria, Ohio, a corporation of Delaware Application February 17, 1944, Serial No. 522,825

11 Claims. (Cl. 303—54)

This invention relates to valve mechanism and more particularly to valve mechanism for controlling the actuators of a fluid pressure brake system.

It has previously been proposed to employ valve mechanisms of the so-called self-lapping type for controlling the actuators of a fluid pressure brake system, such valve mechanisms being generally of the type having inlet and exhaust valves, together with means for controlling the operation of these valves including an element responsive to the pressure supplied to the actuators thereof and a manually operated resilient element actuated by the operator, and commonly known as a graduating spring. In order to prevent the trapping of fluid pressure in the brake actuators on release operation of the brake valve, it has been necessary in the past to so arrange the parts of the self-lapping valve as to maintain the exhaust valve in open position with the brakes released, and this has necessitated sufficient movement of the brake pedal by the operator to close the exhaust valve before any fluid could be supplied to the actuators by the valve mechanism in order to apply the brakes. While the delay necessitated by this operation has been slight, it has been sufficient in some cases to seriously delay the application of the brakes during an emergency, and it is accordingly an object of the present invention to provide simple and efficient means for overcoming this difficulty.

Another object of the invention is to provide control valve means of the self-lapping type so constituted as to insure a substantially instantaneous application of fluid pressure to the brake actuators.

A further object of the invention is to provide, in connection with a brake valve of the self-lapping type, auxiliary valve means controlled by the actuating pedal of the self-lapping valve for insuring a supply of fluid pressure to the brake actuators as soon as the brake pedal is operated.

Still another object of the invention is to provide, in connection with a valve mechanism of the above type wherein the exhaust valve of the self-lapping valve is normally maintained in closed position, auxiliary means for insuring a rapid and complete exhaust of fluid pressure from the brake actuators on release operation of the brake pedal.

A further object of the invention is to provide valve mechanism of the above type so constituted as to automatically supply a predetermined pressure of fluid to the brake actuators on initial operation of the brake pedal.

These and other objects and novel features of the invention will appear more fully hereinafter from the following detailed description when taken in connection with the accompanying drawing, wherein one embodiment of the invention is illustrated.

It is to be expressly understood, however, that the drawing is employed for purposes of illustration only and is not designed as a definition of the limits of the invention, reference being had for this purpose to the appended claims.

Referring to the drawing, the invention is illustrated as including a casing 4 provided with an inlet chamber 5, an outlet chamber 6, a diaphragm chamber 7 and an atmospheric chamber 8, the latter chamber being connected with atmosphere by means of an exhaust conduit 9. The inlet and outlet chambers are separated by means of a ported partition 10 provided with an inlet port 11. This port is adapted to be closed by means of an inlet valve 12 urged toward closed position by means of a valve spring 13 interposed between the upper side of the partition 10 and the lower side of an exhaust valve 14 connected with the inlet valve by means of a valve stem 15. The outlet chamber 6 is connected with a suitable brake actuator 16 by means of a conduit 17. In order that the operation of the inlet and exhaust valves may be suitably controlled, a valve operating element 18 is slidably mounted in a bore 19 formed in the casing and substantially in alignment with the stem of the inlet and exhaust valves, and the element 18 is provided with a bore 20 adapted at its lower end to engage the upper surface of the exhaust valve 14 and connected at its upper end with the exhaust chamber 8. Actuation for this valve element 18 is accomplished in one direction by means of a diaphragm 21 clamped in the casing as shown and subjected on its lower surface to the pressure in the diaphragm chamber 7, and in the other direction by means of a manually operated graduating spring 22 mounted in a bore 23 formed in the upper end of the casing, and adapted on compression to impart downward movement to the diaphragm and valve operating element. The diaphragm is thus subjected on its upper surface to atmospheric pressure in the chamber 8, and on its lower surface to the pressure in the outlet chamber 6 by virtue of a restricted passage 24 leading from the outlet chamber to the diaphragm chamber 7. Operation of the graduating spring is accomplished by means of a plunger 25 slidably mounted in the upper portion of the casing and provided with a shoulder 26 adapted for engagement with the upper end of the graduating spring. Upward movement of the plunger is limited by means of a shoulder 27 formed in the upper end of the bore 23, and the graduating spring is preferably so proportioned that when interposed between the shoulder 26 and the upper end of the valve operating element 18, the spring imparts sufficient downward force to the element to close the exhaust valve and to maintain the inlet valve 12 in open position as shown. In order to prevent undue distortion of the diaphragm under the action of the spring 22, a stop 28 is provided on the casing which serves to engage a flange 29 on the valve operating element in order to limit downward movement of the element. A brake pedal 29a serves to control the operation of the plunger 25, the pedal being pivotally mounted on a bracket portion 30 of the housing by means of a suitable pivot pin 31, and being adapted on movement in a counterclockwise direction to depress the plunger 25 in order to further compress the graduating spring.

The elementary fluid pressure brake system shown in the drawing is further provided with a fluid pressure supply reservoir 32 having a supply conduit 33 connected to a suitable source of fluid pressure, such as a compressor, not shown, and since the inlet valve 12 is normally maintained in open position, it will be apparent that auxiliary means must be provided in order to prevent fluid pressure from being supplied to the brake actuator 16 when the brake pedal is in released position. Such auxiliary means includes a second inlet chamber 34 formed in the casing and connected with the supply reservoir 32 by means of a conduit 35. An auxiliary outlet chamber 36 is also provided in the casing and separated from the inlet chamber by means of a ported partition 37. Communication between these inlet and outlet chambers through the ported partition is normally prevented by means of an inlet valve 38 normally maintained in the position shown by means of a valve spring 39 interposed between the upper surface of the partition and the lower surface of a secondary exhaust valve 40 carried on the upper end of a valve stem 41 which is connected at its lower end to the inlet valve 38. The outlet chamber 36 is connected with the primary inlet chamber 5 by means of a suitable passage 42, and since the inlet chamber 34 is connected with the reservoir by means of a conduit 35, it will be understood that on opening movement of the inlet valve 38, fluid pressure will be supplied to the primary inlet chamber 5 through the conduit 35, inlet chamber 34, ported partition 37, auxiliary outlet chamber 36 and passage 42. Control of the operation of the inlet and exhaust valves 38 and 40 is accomplished by means of a secondary valve operating element 43 slidably mounted in the casing as shown, and provided with a bore 44 which is adapted at its lower end to engage the upper surface of the exhaust valve 40 on downward movement of the element. The bore is connected to an exhaust chamber 45 by means of ports 46 formed in the wall of the bore and the exhaust chamber is connected to atmosphere by means of an exhaust conduit 47. Thus with the parts in the position shown, communication is permitted between the outlet chamber 36 and atmosphere, while on downward movement of the valve operating element 43, communication is prevented between the outlet chamber and atmosphere and is permitted between the inlet chamber 34 and the outlet chamber 36. Downward movement of the element 43 is effected by means of a plunger 48 slidably mounted on the upper portion of the casing and in substantial alignment with the valve operating element 43, the upper end of the plunger being provided with a roller or cam follower 49 adapted to engage the surface of a quick lift cam 50 formed on the hub of the brake pedal 29a. A keyway 51 provided on the plunger is engaged by means of a suitable screw 52 carried by the casing in order to maintain the roller 49 in alignment with the surface of the cam.

The force necessary to impart downward movement to the valve operating element 43 is relatively small due to the fact that the area of the lower end of the element subjected to the pressure in the outlet chamber 36 is relatively small, and it will be understood that the contour of the cam 50 may be so arranged as to insure closing of the exhaust valve 40 and opening of the inlet valve 38 with a very small angular movement of the pedal 29a in a counterclockwise direction about the pivot 31. Assuming that the parts of the control valve are in the position shown, and that the operator is desirous of effecting a slight brake application in order to check the speed of the vehicle, it is only necessary to move the brake pedal 29a downward a small amount, whereupon the cam 50 acts to move the plunger 48 and the valve operating element 43 downward to contact the exhaust valve 40 to prevent communication between the outlet chamber 36 and atmosphere, and to open the inlet valve 38 in order to permit communication between the inlet chamber 34 and the outlet chamber 36, the cam 50 being so constituted that during further movement of the brake pedal to effect a further application of the brakes, the exhaust valve 40 remains in closed position and the inlet valve 38 remains in open position. The outlet chamber 36 is connected with the primary inlet chamber 5 through the passage 42, and since the inlet valve 12 is normally in open position, fluid under pressure from the reservoir 32 is immediately supplied to the brake actuator 16 through the conduit 35, inlet chamber 34, ported partition 37, outlet chamber 36, passage 42, primary inlet chamber 5, port 11, primary outlet chamber 6 and conduit 17, the fluid pressure thus supplied likewise being supplied to the diaphragm chamber 7 through the restricted passage 24. During initial operation of the pedal to close the exhaust valve 40 and open the inlet valve 38, the graduating spring 22 will be further compressed to a slight degree, and if the pedal is moved sufficiently to fully open the inlet valve 38, and is then maintained in that position, the primary valve operating element 18 will be moved upward to permit closing of the inlet valve 12 when the pressure supplied to the actuator and to the diaphragm chamber 7 exerts sufficient force on the diaphragm to overcome the initial compression of the graduating spring plus the additional compression imparted thereto on operation of the pedal to move the inlet valve 38 to open position. When this action occurs, the valves 12 and 14 will be in lapped position and the pressure of fluid in the actuator will automatically be maintained at a value determined by the degree of compression of the graduating spring, as is well-known to those skilled in the art, it being noted that the operation of the primary self-lapping valve mechanism is substantially identical to that set forth in the patent to William J. Andres and Roy S. Sanford, No. 2,133,275 dated October 18, 1938. During further operation of the pedal in a downward direction to increase the pressure of fluid supplied to the actuator, the inlet chamber 5 will be at all times connected with the supply reservoir 32 in view of the construtcion of the cam 50 which serves to maintain the inlet valve 38 in open position during this type of operation, and the self-lapping portion of the valve mechanism will consequently operate in the conventional manner to supply a pressure to the actuator which increases substantially in proportion to the degree of further movement of the brake pedal. Likewise, after a complete brake application, subsequent release movement of the brake pedal will cause fluid pressure to be exhausted from the outlet chamber 6 through the bore 20, and thence to atmosphere through chamber 8 and conduit 9 in the conventional manner until such time as the pedal is moved to complete released position. When this position is reached, however, a slight tension will be maintained on the graduating spring as heretofore explained, and there will consequently be a tendency for fluid pressure to be trapped in the outlet chamber and in the actuator having a value proportional to the degree of compression of the graduating spring. In order to insure the complete exhaust of fluid pressure from the outlet chamber 6 or from the actuator 16, means are provided for connecting the outlet chamber 6 with the outlet chamber 36 of the auxiliary portion of the control valve, such means constituting a passage 53 connected with the chamber 6, a passage 54 connected with the chamber 36 and a ball check valve 55 in engagement with the right end of the passage 53 for the purpose of permitting the flow of fluid pressure from the chamber 6 to chamber 36 and for preventing the flow of fluid pressure in the reverse direction. It will be understood that it is necessary to provide the check valve 55 in order to prevent the flow of fluid pressure from the outlet chamber 36 to the outlet chamber 6 through the passages 54 and 53 in view of the fact that when the valve is operated to apply the brakes, the chamber 36 is at all times at reservoir pressure, and the application of such a pressure to the chamber 6 through the above passages instead of under the control of the primary inlet valve 12 would increase the pressure in the outlet chamber 6 and in the diaphragm chamber 7 to a value above that for which the graduating spring was set, with a resultant continuous exhaust of fluid pressure to atmosphere from the chamber 6 through the bore 20, the exhaust chamber 8 and the exhaust conduit 9. Thus the check valve 55 effectively prevents the supplying of reservoir pressure to chamber 6 through the passages 53 and 54 and at the same time permits the unrestricted exhaust of pressure from the chamber 6 through the chamber 36 when the brake pedal is in released position and the valve operating element 43 is moved upward to open the auxiliary exhaust valve. Consequently when the pedal is moved to fully released position, the pressure in the chamber 36 will force the valve operating element upward and out of engagement with the exhaust valve 40 in order to permit communication between the chamber 36 and atmosphere through the path already described, and any fluid pressure which might otherwise be trapped in the outlet chamber 6 and in the actuator 16 will flow directly to the chamber 36 through passages 53, check valve 55 and passage 54, and will be exhausted to atmosphere through the bore 44, ports 46 and exhaust conduit 47, thus insuring a complete release of the vehicle brakes on release of the brake pedal.

Thus a construction has been provided wherein the inlet valve of the self-lapping type brake valve is normally maintained in open position in order to provide an unrestricted passage for the flow of fluid to the brake actuator, and the construction is such that movement of the brake pedal to effect a brake application immediately increases the tension on the graduating spring with a resultant tendency to maintain the inlet valve in open position during downward movement of the pedal. At the same time, initial movement of the pedal to apply the brakes results in an immediate operation of the auxiliary inlet valve 38 in order to provide a direct and unrestricted passage from the supply reservoir to the inlet chamber 5, with the result that fluid pressure is supplied to the actuator with the utmost rapidity. While previous constructions have been proposed wherein the brake pedal was provided with a quick lift cam operating directly on the self-lapping valve plunger 25 in order to insure immediate closing of the exhaust valve and opening of the inlet valve, the forces involved in such a construction due to the necessity of moving the diaphragm downward against fluid pressure in order to operate the valves, are so great as to render initial operation of the pedal to close the exhaust valve and open the inlet valve difficult for the operator. With this type of construction, a relatively large force is required for initial operation of the pedal, and since this force falls off rapidly as soon as the cam has ceased to act, there is a tendency for the operator to suddenly depress the pedal to its full extent with a resultant severe application of the brakes which is detrimental to the vehicle as well as dangerous to the passengers carried therein. This difficulty is avoided in the present construction due to the ease with which the auxiliary valve operating element 43 may be moved downward to close the auxiliary exhaust valve and open the auxiliary intake valve, and this construction likewise places no restriction on the establishment of a proper mechanical advantage between the pedal 29a and the self-lapping valve plunger 25 for the purpose of permitting the most satisfactory type of operation of the self-lapping portion of the valve mechanism. Means are also provided for adjusting the initial tension of the graduating spring 22, such means in the present instance being illustrated as including a shim 56 interposed between the shoulder 27 and the flanged portion of the plunger 25. In like manner, shims 57 may be interposed between the plunger 48 and the valve operating element 43 in order to adjust the degree of opening of the exhaust valve 40, it being expressly understood, however, that any suitable adjusting means may be incorporated in the mechanism in place of the shims above described.

There has thus been illustrated and described in connection with the present invention, novel and efficient self-lapping valve means so constituted as to effect an extremely rapid initial application of the brakes, and so constituted as to insure complete release of fluid pressure from the brake actuators on movement of the brake pedal to released position. The regular inlet valve of the self-lapping valve mechanism is normally maintained in wide open position, and fluid pressure is supplied to this valve from the reservoir by means of an auxiliary inlet valve which may be arranged to operate almost instantaneously on initial downward movement of the brake pedal. Thus extremely rapid application of the brakes is obtained, and at the same time, fluid pressure is initially supplied to the brake actuators in response to an extremely small movement of the brake pedal from released position. In addition to the foregoing, the advantages of the so-called preloading of the graduating spring are obtained.

Although one embodiment of the present invention has been illustrated and described herein with considerable particularity, it is to be expressly understood that variations, changes and substitutions may be made therein without departing from the spirit of the invention. Reference will, therefore, be had to the appended claims for a definition of the limits of the invention.

What is claimed is:

1. In combination with a fluid pressure actuator, self-lapping valve means for controlling the flow of fluid to and from the motor including inlet and exhause valves, actuating means for said valves including a pressure responsive member and a graduating spring, means for adjusting said graduating spring to maintain the inlet valve in open position until a predetermined pressure is supplied to the actuator, and a control element having a release position and movable for increasing the compression of said spring for operating the valves to supply fluid to said actuator at pressures greater than said predetermined pressure, a source of fluid pressure, and auxiliary valve means operable on initial movement of said control element for establishing a connection between said source and self-lapping valve means and for maintaining said connection during further movement of said element, and operable when said control element is in release position to connect said motor with atmosphere.

2. In combination with a fluid pressure actuator, self-lapping valve means for controlling the flow of fluid to and from the actuator including inlet and exhaust valves, actuating means for said valves including a pressure responsive member and a graduating spring, means for adjusting said graduating spring to maintain the inlet valve in open position until a predetermined pressure is supplied to the actuator, and a control element having a release position and operable from release position for increasing the compression of said spring for operating said valves to supply fluid to said actuator at pressures greater than said predetermined pressure, a source of fluid pressure, and means for controlling the supply of fluid to said actuator through said self-lapping valve means including auxiliary valve means controlled by the operation of said element for exhausting fluid from said actuator when said element is in release position and for establishing and maintaining a connection between said source and self-lapping valve means on movement of the element from release position.

3. The combination with a self-lapping valve mechanism including inlet and exhaust valves, inlet and outlet chambers, an element for operating the valves, means including a member responsive to the pressure in the outlet chamber for moving the element in one direction, and means for moving the element in the other direction including a manually operable member having a release position and resilient means connecting said manually operable member and element adapted to position the element to close the exhaust valve and open the inlet valve when the manually operable member is in release position, of means for controlling the supply of fluid pressure to said self-lapping valve mechanism including auxiliary inlet and exhaust valves, and means controlled by movement of the manually operable member for closing the auxiliary exhaust valve and maintaining the auxiliary inlet valve in open position to supply fluid pressure to said inlet chamber whenever said manually operable member is moved from release position.

4. The combination with a self-lapping valve mechanism including inlet and exhaust valves, inlet and outlet chambers, an element for operating the valves, means including a member responsive to the pressure in the outlet chamber for moving the element in one direction, and means for moving the element in the other direction including a manually operable member having a release position and resilient means connecting said manually operable member and element adapted to position the element to close the exhaust valve and open the inlet valve when the manually operable member is in release position, of means for controlling the supply of fluid pressure to said self-lapping valve mechanism including auxiliary inlet and exhaust valves, means controlled by movement of the manually operable member for closing the auxiliary exhaust valve and maintaining the auxiliary inlet valve in open position to supply fluid pressure to said inlet chamber whenever said manually operable member is moved from release position, and means for permitting the exhaust of fluid pressure from the outlet chamber through the auxiliary exhaust valve when the manually operable member is in release position.

5. The combination with a self-lapping valve mechanism including inlet and exhaust valves, inlet and outlet chambers, an element for operating the valves, means including a member responsive to the pressure in the outlet chamber for moving the element in one direction, and means for moving the element in the other direction including a manually operable member having a release position and resilient means connecting said manually operable member and element adapted to position the element to close the exhaust valve and open the inlet valve when the manually operable member is in release position, of means for controlling the supply of fluid pressure to said self-lapping valve mechanism including auxiliary inlet and exhaust valves, means controlled by movement of the manually operable member for closing the auxiliary exhaust valve and maintaining the auxiliary inlet valve in open position to supply fluid pressure to said inlet chamber whenever said manually operable member is moved from release position, a passage for permitting the exhaust of fluid pressure from the outlet chamber through the auxiliary exhaust valve when the manually operable member is in release position, and means for preventing the supplying of fluid pressure to the outlet chamber through said passage when the auxiliary inlet valve is open.

6. In a self-lapping valve mechanism of the type having inlet and outlet chambers, inlet and exhaust valves, and means for operating said valves to control the flow of fluid pressure between said chambers and to control the release of fluid pressure from the outlet chamber including a member responsive to the pressure in the outlet chamber for operating the valves in one direction, a resilient member for operating the valves in the other direction, and an operator's control element having a release position and movable to operate the resilient member, means for controlling the supply of fluid pressure to the valve mechanism including auxiliary inlet and exhaust valves, and means controlled by movement of said element for operating said auxiliary valves to supply fluid pressure to the outlet chamber through the inlet chamber when the element is moved from release position and to exhaust fluid pressure from the outlet chamber when the element is in release position.

7. Control valve mechanism for controlling the supply of fluid pressure from a source to an actuator and for controlling the release of fluid from the actuator including a casing having an inlet chamber, an outlet chamber connected with the actuator, inlet and exhaust valves operable for respectively controlling the flow of fluid between said chambers and for exhausting fluid from the outlet chamber, means including resilient means for operating the valves, said resilient means being adjusted to normally maintain the exhaust valve in closed position and the inlet valve in open position, means responsive to the pressure in the outlet chamber for controlling the operation of the valves by said resilient means, an operator's control member for the resilient means having a release position, an auxiliary inlet chamber connected with the source, an auxiliary outlet chamber connected with the first named inlet chamber, a passage between the auxiliary outlet chamber and the first named outlet chamber, a valve in said passage for permitting the flow of fluid from the first named outlet chamber to the auxiliary outlet chamber and for preventing the flow of fluid in the reverse direction, auxiliary inlet and exhaust valves for respectively controlling the flow of fluid between the auxiliary inlet and outlet chambers and the exhaust of fluid from the auxiliary outlet chamber, and means operable on movement of the operator's control member for closing the auxiliary exhaust valve and maintaining the auxiliary inlet valve in open position except when the operator's control member is in release position.

8. Control valve mechanism for controlling the supply of fluid pressure from a source to an actuator and for controlling the release of fluid from the actuator including a casing having an inlet chamber, an outlet chamber connected with the actuator, inlet and exhaust valves operable for respectively controlling the flow of fluid between said chambers and for exhausting fluid from the outlet chamber, means including resilient means for operating the valves, said resilient means being adjusted to normally maintain the exhaust valve in closed position and the inlet valve in open position, means responsive to the pressure in the outlet chamber for controlling the operation of the valves by said resilient means, an operator's control member for the resilient means having a release position, an auxiliary inlet chamber connected with the source, an auxiliary outlet chamber connected with the first named inlet chamber, a passage between the auxiliary outlet chamber and the first named outlet chamber, a valve in said passage for permitting the flow of fluid from the first named outlet chamber to the auxiliary outlet chamber and for preventing the flow of fluid in the reverse direction, auxiliary inlet and exhaust valves for respectively controlling the flow of fluid between the auxiliary inlet and outlet chambers and the exhaust of fluid from the auxiliary outlet chamber, and means including a quick lift cam operable on initial movement of the operator's control member from release position to close the auxiliary exhaust valve and open the auxiliary inlet valve and operable during further movement of said operator's control member to maintain said last named valve in open position.

9. Control valve mechanism for controlling the flow of fluid pressure between a source and an actuator and between the actuator and atmosphere including a casing having inlet and outlet chambers, inlet and atmospheric valves operable for respectively controlling communication between the chambers and communication between the outlet chamber and atmosphere, means including resilient means for operating said valves to normally maintain the exhaust valve in closed position and the inlet valve in open position, means responsive to the pressure of fluid in the outlet chamber for controlling the operation of the valves by said resilient means, an operator's control member for operating said resilient means having a release position, an auxiliary inlet chamber connected with the source, an auxiliary outlet chamber connected with the first named inlet chamber, a passage between the auxiliary outlet chamber and the first named outlet chamber, auxiliary inlet and atmospheric valves for respectively controlling communication between the auxiliary inlet and outlet chambers and between the auxiliary outlet chamber and atmosphere, means operable on movement of said operator's control member for closing the auxiliary atmospheric valve and opening the auxiliary inlet valve except when said control member is in release position, and means associated with said passage for permitting communication between the first named and auxiliary outlet chambers in one direction and for preventing communication therebetween in the opposite direction.

10. In a fluid pressure control system having a source of fluid pressure and an actuator, means for controlling the pressure of fluid in the actuator including self-lapping valve mechanism having an outlet chamber connected with the actuator, an inlet chamber, inlet and exhaust valves, and means for controlling the operation of said valves including an operator's control member having a release position and resilient means for connecting said member and valves and for normally maintaining the inlet valve in open position, and auxiliary valve means operable on initial movement of the control member from release position to connect said source and inlet chamber and operable when said control member is in release position to connect said actuator with atmosphere.

11. In a fluid pressure control system having a source of fluid pressure and an actuator, means for controlling the pressure of fluid in said actuator including self-lapping valve mechanism having an outlet chamber connected with the actuator, an inlet chamber, inlet and exhaust valves for controlling the flow of fluid through said chambers, and means for controlling the operation of said valves including an operator's control member having a release position and means including a resilient element for connecting said member ad valves, and means including auxiliary valve means controlled by said member operable to exhaust fluid from said actuator when the member is in release position and operable to connect said source and inlet chamber when the member is moved from said release position.

WILFRED A. EATON.